United States Patent [19]
Kuroyanagi et al.

[11] Patent Number: 5,619,527
[45] Date of Patent: Apr. 8, 1997

[54] CHIP-BASED SELECTIVE RECEIVING SYSTEM FOR A SPREAD SPECTRUM SIGNAL

[75] Inventors: Noriyoshi Kuroyanagi, Tokyo; Naoki Suehiro, Ibaraki; Toshikatsu Naito, Samukawa-machi, all of Japan

[73] Assignees: Toyo Communication Equipment Co., Ltd., Kanagawa; Noriyoshi Kuroyanagi, Tokyo, both of Japan

[21] Appl. No.: 387,702

[22] PCT Filed: Jun. 2, 1994

[86] PCT No.: PCT/JP94/00892

§ 371 Date: Feb. 10, 1995

§ 102(e) Date: Feb. 10, 1995

[87] PCT Pub. No.: WO95/01016

PCT Pub. Date: Jan. 5, 1995

[30] Foreign Application Priority Data

Jun. 23, 1993 [JP] Japan ................................ 5-176145

[51] Int. Cl.⁶ .............................................. H04B 1/707
[52] U.S. Cl. ........................ 375/206; 375/201; 375/204
[58] Field of Search ............................. 375/200, 201, 375/204, 206, 208, 209, 210

[56] References Cited

U.S. PATENT DOCUMENTS

| | | | |
|---|---|---|---|
| 4,774,715 | 9/1988 | Messenger | 375/208 |
| 5,151,921 | 9/1992 | Hashimoto | 375/208 |
| 5,168,508 | 12/1992 | Iwasaki et al. | 375/200 |
| 5,170,411 | 12/1992 | Ishigaki | 375/200 |

*Primary Examiner*—Stephen Chin
*Assistant Examiner*—Jeffrey W. Gluck
*Attorney, Agent, or Firm*—Koda and Androlia

[57] ABSTRACT

A signal receiving system for spread spectrum communication including receiving a signal produced by multiplying a data to be transmitted by a predetermined spread code sequence through spread spectrum modulation and performing spread spectrum demodulation by multiplying the received signal by an attenuation spread code sequence prepared by predetermined attenuation or amplification to each chip of the spread code sequence used on that modulation.

7 Claims, 9 Drawing Sheets

FIG. 2(c)  $e_\Delta$

FIG. 2(d)  $e_{SS}$

M-SEQUENCE $e_M$
FIG. 3(a)

SKIPPED M-SEQUENCE $e_{SM}$
FIG. 3(b)

SHAPED M-SEQUENCE $e_{SS}$
FIG. 3(c)

FIG. 18(a) SIGNAL LENGTH

FIG. 18(b) SIGNAL INSTANTANEOUS FREQUENCY

FIG. 19 WINDOW FUNCTION

CHIP-BASED SELECTIVE RECEIVING SYSTEM FOR A SPREAD SPECTRUM SIGNAL

TECHNICAL FIELD

The present invention relates to a signal receiving system for spread spectrum communication which can enhance withstandability against noise mixed into the signal the transmission process.

BACKGROUND ART

Spread spectrum communication is designed to spread data having a relatively narrow bandwidth into a relatively wide frequency band by modulating it as a spread code sequence. Thus, this communication method requires in essence relatively low transmission power per unit frequency, and it leads to minimization of interference to other communication operations and excellent withstandability against environmental noises incoming during the transmission process.

Figure 6:
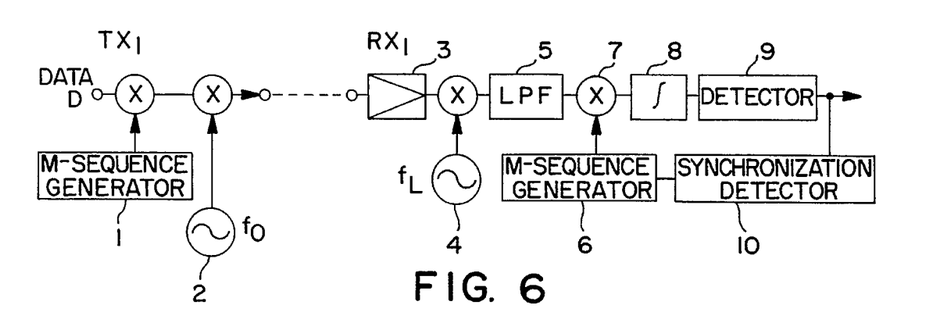
FIG. 6 is a block diagram showing construction of an example of the conventional spread spectrum system.

FIG. 6 is a block diagram showing the general construction of a system for performing spread spectrum communication through radio communication. In the same drawing, transmitter $TX_1$ performs product modulation of a spread code sequence generated from data D through sequence generator 1, and modulates the carrier wave having frequency $f_0$ generated by oscillator 2 using the product-modulated signal. The carrier wave including data D subjected to such a spread spectrum process is then transmitted to receiver $RX_1$ through radio communication. In that case, a pseudo noise sequence (PN sequence) having the same bit periodic length as that length of data D is generally used as the spread code sequence. Thus, the related art is described here with reference to the so-called M-sequence which is used most widely among these PN sequences.

Transmitter $RX_1$ introduces the spread-spectrum-modulated signal into amplifier 3 through an antenna (not shown) to amplifier it to a desired level. Then, the signal processed by frequency mixing with local signal $f_L$ ($\approx f_0$) of local oscillator 4 is demodulated into a spread signal of a base band through low pass filter 5. Thereafter, the base band spread signal and an M-sequence code identical to that used in the transmitter $TX_1$ and generated from sequence generator 6 are supplied to multiplier 7. The output of multiplier 7 is and then integrated for a period of one frame of the M-sequence by integrator 8 that produces the cross-correlation of these signals. Further, the so-obtained signal is demodulated into the original data D by detector 9 at the end point of the frame. Then, the demodulated data is supplied to a control terminal of the sequence generator 6 through chip (and/or frame) timing synchronization detector 10 to synchronize the M-sequence generation timing with the phase of the received signal.

Figure 7:
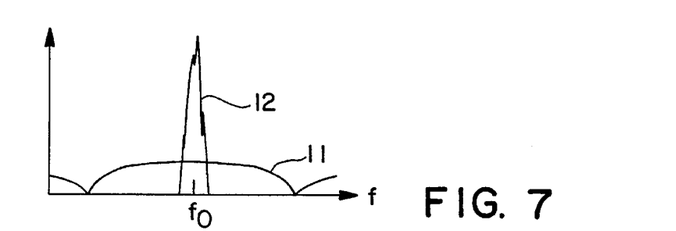
FIG. 7 is a diagram schematically showing spectra of spread signals in the transmission process.
Figure 8:
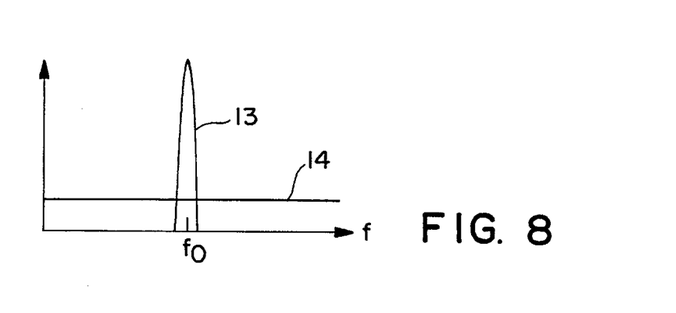
FIG. 8 is a diagram schematically showing spectra of signals subjected to a spread demodulation.

FIG. 7 is a diagram schematically showing spectra of signals in the transmission process, wherein reference numeral 11 designates a spectrum of the spread-spectrum-modulated signal while 12 designates that of the incoming environmental noise. Namely, by the demodulation (inversion) using the M-sequence in the receiver, as shown in FIG. 8, the spread-spectrum-modulated signal 11 having been spread in a relatively wide frequency band is transformed into signal 13 with a relatively narrow bandwidth while the environmental noise 12 is transformed into signal 14, spread in a relatively wide frequency band. Therefore, this method is now considered as a communication method capable of minimizing the influence of environmental noises.

However, the spread-spectrum-modulated signal in such a system is spread over an extremely wide frequency range. Thus, in the event that the signal reaches the receiver through a transmission system such that colored noise like the environmental noise 12 of FIG. 7 having highly concentrated power in a relatively narrow band present at plural points over that frequency range, the noise level 14 after the inversion due to the M-sequence is drastically increased despite the spreading effect given by the M-sequence, thereby degrading the S/N ratio.

The present invention was made to solve the problem of the conventional spread spectrum communication system as mentioned above. Therefore, it is an object of this invention to provide a signal receiving system for spread spectrum communication which is improved in the receiving S/N characteristics by reducing the influence of colored noise having a relatively narrow band spectrum which is added to the receiving signal through the transmission process.

DISCLOSURE OF INVENTION

To achieve the above objective, the present invention provides a receiving system for a spread spectrum signal which receives a spread-spectrum-modulated signal, produced by multiplying data to be transmitted or a carrier wave signal generated from the data through predetermined modulation by a predetermined spread code sequence, and performs spread spectrum demodulation by multiplying the received signal by a waveform shaped spread code sequence prepared by applying proper attenuation or amplification to each chip of the spread code sequence used in that predetermined modulation. Further, to reduce the influence of incoming colored noise in the received signal, the attenuation of the spread code sequence is prepared by changing the level of each chip in the spread code sequence to prevent the frequency component of the colored noise from being outputted during the demodulation process. Alternatively, the spread spectrum demodulation is carried out in parallel using a plurality of different shapes given to each chip amplitude of the spread code sequence, and the frequency range of an incoming strong noise is estimated by comparing the respective outputs of the correlated demodulation. Then, a plurality of attenuated spread sequences not demodulating that noise frequency component are selected to obtain a plurality of demodulation outputs through demodulation, thereby fixing a demodulation data providing the most applicability among these outputs using comparison judgement means.

BEST MODE FOR CARRYING OUT THE INVENTION

For better understanding of this invention, we describe the principle and characteristics of the skipped M-sequence demodulation receiving (SMD) system that is a major premise of the present invention.

For avoiding the influence of colored noise from the natural environment during the communication process, it is possible to use a method of eliminating such colored noise by providing a proper filter at a predetermined location before the receiver. However, if a specific frequency component FE of the received signal is eliminated by that filter, the spread spectrum signal included in not only the FE band but also the other bands of the received signal is also excluded or degraded, because implementation of an ideal filter for eliminating the colored noise is practically impossible. Therefore, in such a case, the chip voltage output obtained by multiplying that signal by an M-sequence on the receive side is not uniformly positive (or negative) relative to "1" (or "0") of the transmission data. In addition, when this output is not uniform, the demodulation output to be obtained by integrating these mixed positive and negative voltage outputs will be drastically degraded. As a result, the problem of error occurrence can not be solved enough even by this method.

On the other hand, an improved skipped M-sequence demodulation receiving system of the present invention can effectively avoid the influence of such colored noise. Hereinafter, the principle of this system will be described with reference to FIGS. 9.

Figure 9A:
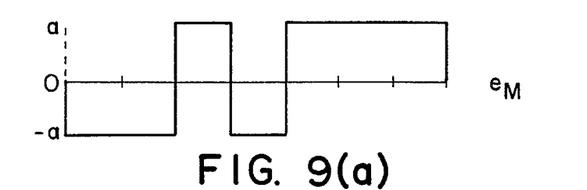
FIGS. 9(a)–9(d) show the principle of a skipped M-sequence demodulation receiving system.
Figure 9B:
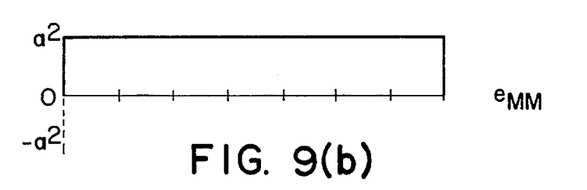

In case of a conventional receiving demodulation system for receivng a spread spectrum modulated signal without being influenced by any noise in he transmission process and demodulating that signal using M-sequence $e_M$ composed of 7 chips (0010111) as shown in FIG. 9(a), which is identical to the one used for the modulation on teh transmitter side, the multiplication output $e_{MM}$ for those 7 chips presents a flat waveform as shown in FIG. 9(b).

Figure 9C:
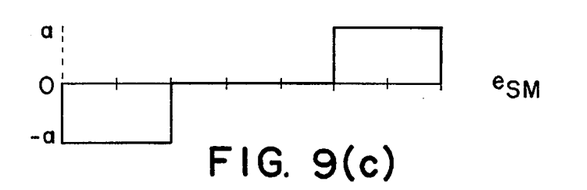
Figure 9D:
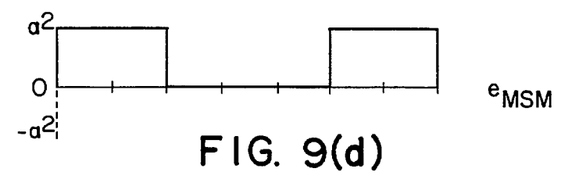

On the other hand, in case of demodulation using skipped M-sequence $e_{SM}$ having a toothless waveform as shown in FIG. 9(c) in which a certain chip portion of the M-sequence used for the modulation on the the transmitter side is omitted, the multiplication output $e_{MSM}$ shows a waveform as shown in FIG. 9(d) in which the portion corresponding to the omitted chips is left out. Namely, by adjusting the frequency component corresponding to the portion having chips left out to the frequency component of colored noise, the level of that colored noise can be significantly reduced.

In this case, when the code length of the skipped M-sequence is M and the number of chips utilized is u, the chip utilization factor $\alpha$ is defined as $\alpha=u/M$. Namely, in the case of these drawings, M=7 and $\alpha=4/7$. Accordingly, the power corresponding to the outputs $e_{MM}$ and $e_{MSM}$ obtained after the spread demodulation is $a^2$ and $\alpha a^2$, respectively.

These are many cases of selecting the skipped positions in such a skipped M-sequence (SM) signal. It is highly efficient if such a group of sequences are utilized so that their frequency characteristics can be complementary to each other. Thus, the complement is examined from the cross-correlation of a continuous frame composed of, for example, non-inverted and inverted elements of i-the sequence $e_{SMi}$ (i=0, 1, 2 . . . ) to a j-th sequence $e_{SMj}$.

For the signal modulated by an M-sequence $e_M$ composed of 7 chips (0010111) shown in FIG. 9(a), two patterns of skipped M-sequences $e_{SM0}$ (3, 4, 5) and $e_{SM1}$ (1, 6, 7) which are complementary to each other are used. In that case, each numerical value in these parentheses designates each skipped chip position constituting the 7 chips in succession.

Figure 10A:
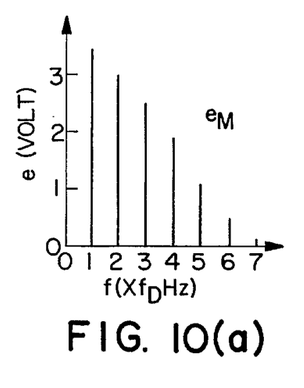
FIGS. 10(a) to 10(c) are spectrum diagrams of an M-sequence and skipped M-sequences, respectively.
Figure 10B:
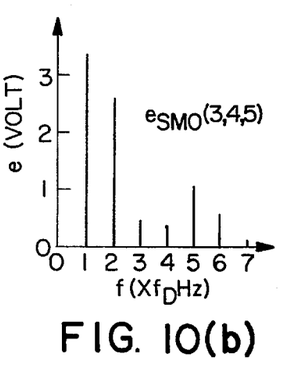
Figure 10C:
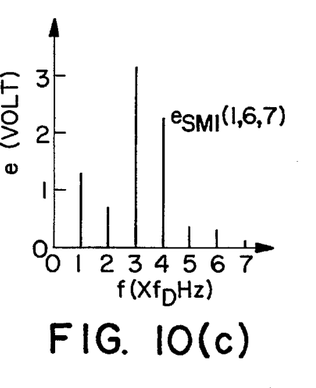

FIGS. 10(a) to 10(c) show spectra of waveforms respectively repeating at each data cycle for an M-sequence and two skipped M-sequences. Namely, the object of this invention is to avoid the influence of incoming colored noise by utilizing the difference between these frequency characteristics.

Figure 11:
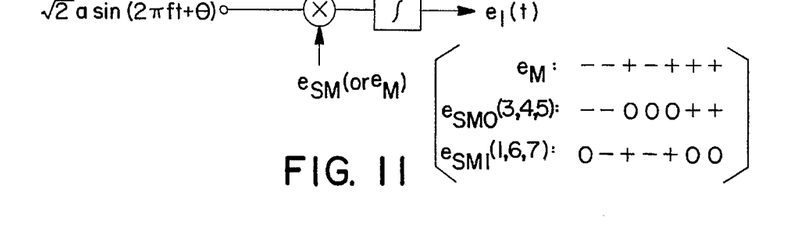
FIG. 11 shows a simulation model of a skipped M-sequence demodulation receiving apparatus.

Next, the demodulation (multiplication) output in case of using a simulation model as shown in FIG. 11 and inputting a sine wave to this model is obtained to compare the frequency characteristics of this skipped M-sequence demodulation receiving system with the conventional M-sequence system. The sequences $e_M$, $e_{SM0}$ and $e_{SM1}$ to be multiplied are shown in the bracket, respectively. In that case, the input to the integrator is zero for each chip interval when $e_{SM}=0$, and each output is designed to be a binary number.

Figure 12A:
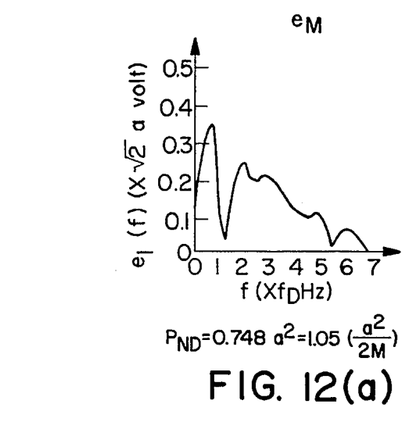
FIGS. 12(a) to 12(c) show frequency characteristics to be provided by spread demodulation using an M-sequence and skipped M-sequences, respectively.
Figure 12B:
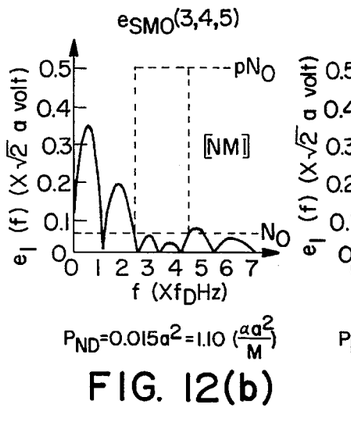
Figure 12C:
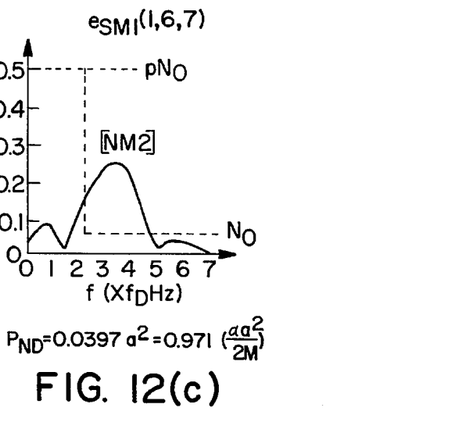

FIGS. 12(a) to 12(c) respectively show the demodulation frequency characteristics of demodulation output $e_I$ obtained by integrating over each data cycle the multiplication output between each waveform of $e_M$, $e_{SM0}$ (3, 4, 5) or $e_{SM1}$ (1, 6, 7) and the sine wave. In that case, the phase $\theta$ of this sine wave with frequency f is uniformly distributed, and the mean value of the absolute value of that integrated voltage output over the phase $\theta$ and viewed in the frequency domain is designated by $e_I(f)$.

These characteristics correspond to the response of incoming white noise with a uniform amplitude over the used frequency band $(0-f_c)$ when it passes through a matched filter of the M-sequence or skipped M-sequence. If the data rate is expressed by $f_d$, $f_c$ becomes $7 f_d$ because $f_c$ designates the chip rate and the length of M-sequence is 7 chips in this case. Thus, the horizontal axis of FIGS. 12 is shown in the unit of $f_d$. Accordingly, the noise power PND is obtained as follows by integrating the square of $e_I(f)$ over the used frequency band $(0-f_c)$.

$$P_{ND} = \frac{1}{f_c} \int_0^{f_c} [e_I(f)]^2 df \qquad (1)$$

This corresponds to obtaining the area defined between each curve and the horizontal coordinate axis in FIGS. 12, and each value of the equation designated below each graph shows the result of simulation on this area so that the coefficient in the last term of each equation theoretically becomes 1.00.

Consequently, the obtained coefficient substantially conforms to 1.00 within the 10% error range.

It should be understood that there is strong correlation between the spectra in FIGS. 10 and the demodulation characteristics in FIGS. 12. Also, it should be noted that the signal input to the integrator is zero for the skipped chip interval in the skipped M-sequence.

Next, the signal-to-noise ratio is estimated in the light of the above characteristics.

Figure 13A:
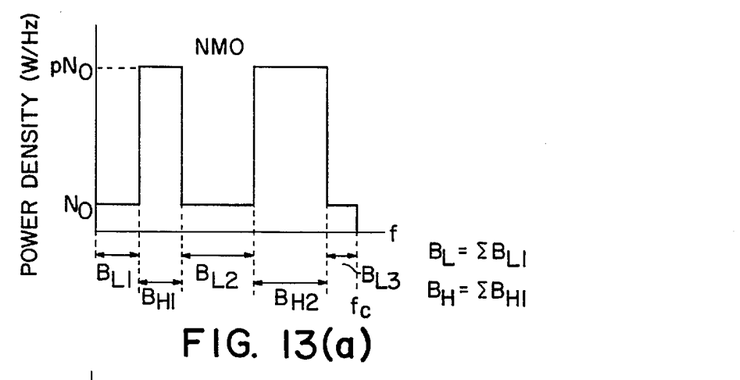
FIG. 13(a) shows idealized natural environmental noise characteristics, and 13(b) schematically shows demodulation characteristics of an imaginary skipped M-sequence corresponding thereto.
Figure 13B:
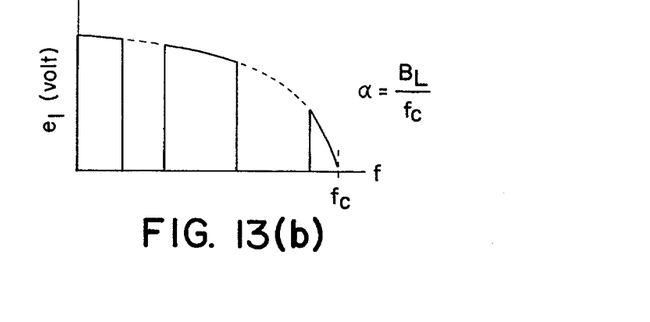

FIGS. 13 schematically show idealized natural environmental noise characteristics and demodulation characteristics of an imaginary skipped M-sequence.

In FIG. 13(a), $N_0$ is a power density of fundamental noises, such as thermal noise and semiconductor noise added in the receiving amplification, which designates white noise presenting a flat characteristic over a wide frequency band. Also in the same drawing, $pN_0$ denotes a power density of colored noise which is described as a multiple value of $N_0$. Further $B_{Li}$ and $B_{Hi}$ are noise bands respectively corresponding to these power densities, and $B_H$ and $B_L$ are the sums of $B_{Hi}$ and $B_{Li}$ over i, respectively. Since it can be assumed that $B_{Li}$ substantially conforms to the portion corresponding to the chips demodulatable in the skipped M-sequence while $B_{Hi}$ to the portion corresponding to the skipped chips, the following approximation can be established.

$$B_L \approx \alpha f_c = \alpha(B_L + B_H) \qquad (2)$$

In such an ideal model, the skipped M-sequence demodulation receiving system is not subject to the colored noise (see FIG. 13(b)).

Now assume that the total white noise power $N_{wc}$ in the $f_c$ band is equal to the signal power $a^2$.

$$N_{wc} = N_0 f_c = a^2 \qquad (3)$$

In that case, the noise in the $f_d$ band (the band corresponding to M chip length or data rate of the M-sequence) becomes as follows.

$$N_{PDM} = \frac{N_0 f_D [\alpha + p(1-\alpha)]}{2} = \frac{a^2}{2M} [\alpha + p(1-\alpha)] \qquad (4)$$

$$= \frac{a^2}{2M} \qquad (p=1)$$

On the other hand, only the band $B_L$ must be considered in case of the demodulation using the skipped M-sequence.

$$N_{PDSM} = \alpha N_0 f_D / 2 = \alpha a^2 / (2M) \qquad (5)$$

Namely, in case of the M-sequence demodulation, +a and −a can be obtained as the non-inversion and inversion outputs and the peak-to-peak signal power becomes $S = (2a)^2$ from the amplitude. However, in case of skipped M-sequence demodulation, the signal power becomes $\alpha$ times the value of $(2a)^2$. Thus, the S/N ratio after demodulation becomes as follows:

$$(S/N)_M = \frac{4a^2}{N_0 f_D [\alpha + p(1-\alpha)]/2} = \frac{8M}{[\alpha + p(1-\alpha)]} \qquad (6)$$

$$(S/N)_{SM} = \frac{4\alpha a^2}{\alpha N_0 f_D/2} = \frac{4M}{N_0 f_D/2} = 8M \qquad (7)$$

where equation (7) corresponds to the case of p=1 in equation(6).

Figure 14:
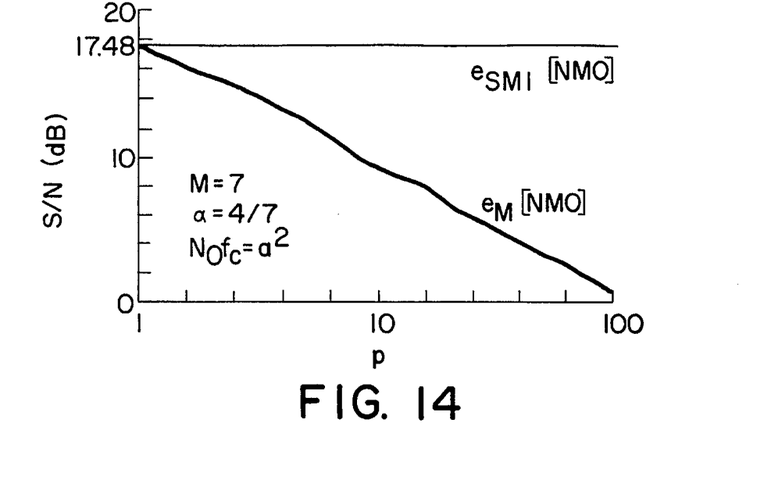
FIG. 14 shows an S/N ratio with respect to a p corresponding to the level of a colored noise.

FIG. 14 shows the S/N ratio obtained from equations (6), (7) with respect to p corresponding to the level of colored noise. As is clearly seen from the same drawing, the skipped M-sequence demodulation receiving system is more advantageous than the ideal model regarding the colored noise with strength of p>4 so that it can effectively avoid the influence of particularly strong colored noise. Though $(2a)^2$ is used in this case as the signal power for calculating the S/N ratio based on the signal amplitude corresponding to "1" and "0" at the signal receiving point, it is also possible to use the signal power ($a^2$) at the transmission point shown in the equation (3). In the latter case, though the S/N ratio is lowered by 6 dB, the theoretical result becomes the same as the former.

Next, the influence of colored noise is evaluated about realistic models based on the result of the aforementioned simulation.

If the demodulation output $e_I(f)$ shown in FIGS. 12 is changed in accordance with the colored noise characteristics into the following forms:

$$e_{IP}(f) = \frac{\sqrt{p N_0 f_c} \; e_I(f)}{a} \qquad (f \in B_H) \qquad (8)$$

and $$e_{IP}(f) = \frac{\sqrt{N_0 f_c} \; e_I(f)}{a} \qquad (f \in B_L), \qquad (9)$$

the demodulation characteristics are obtained in the forms as shown in FIGS. 15, respectively. FIGS. 15(a) and 15(b) respectively show demodulation characteristics of models [NM1] and [NM2] shown respectively in FIGS. 12(a) and 12(b), by the M-sequence in case of p=10, while FIGS. 15(c) and 15(d) respectively show demodulation characteristics for the same models by the skipped M-sequence. Thus, the in-band noise output $P_{NPD}$ is obtained by integrating the $e_{IP}(f)$ using equation (1). Then, the S/N ratio after demodulation is obtained as follows:

$$(S/N) = 4a^2/P_{NPD} \qquad (10)$$

Figure 15A:
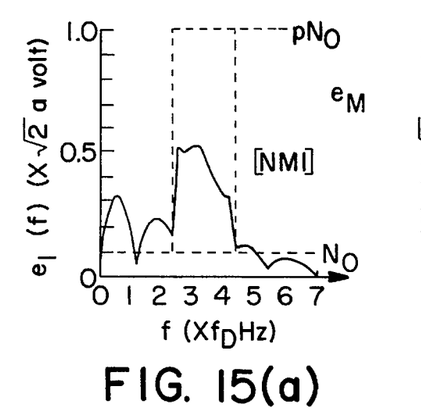
FIGS. 15(a)–15(d) respectively show demodulation characteristics in case of the spread demodulation using a skipped M-sequence.
Figure 15B:
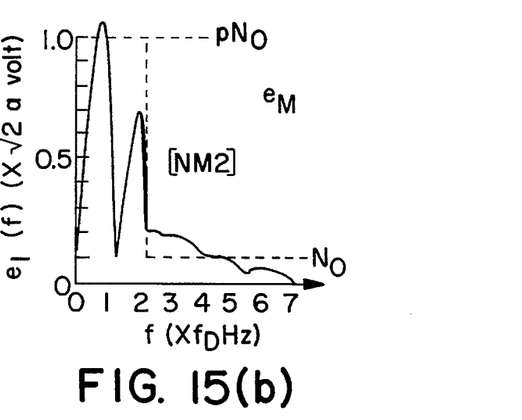
Figure 15C:
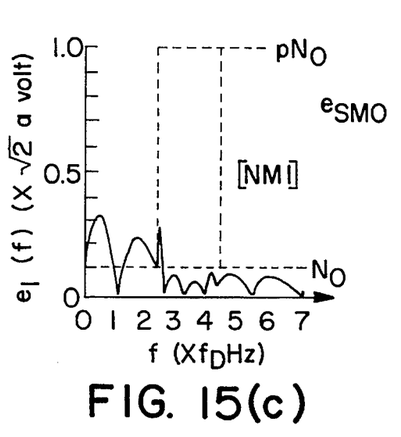
Figure 15D:
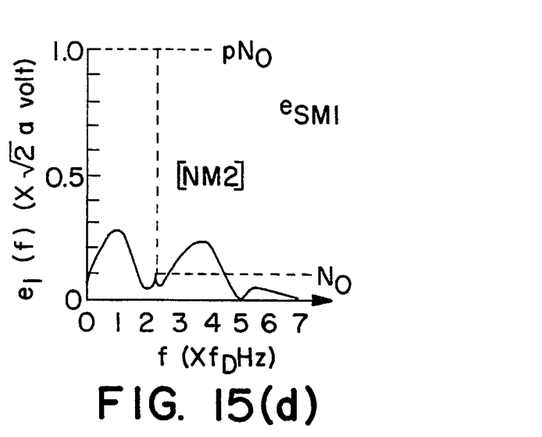
Figure 16:
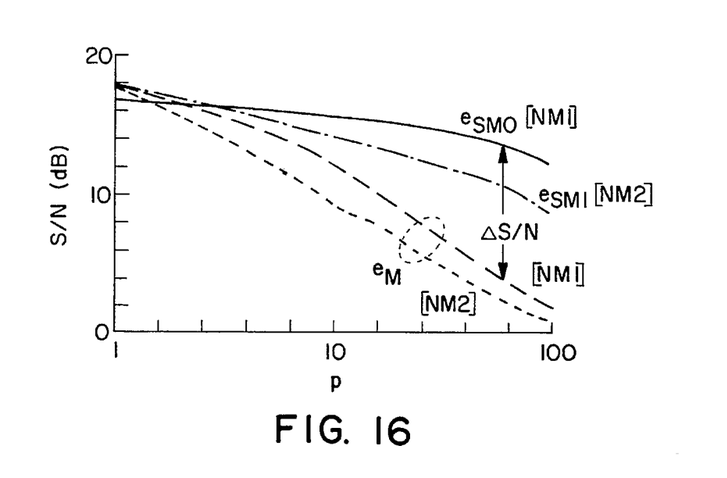
FIG. 16 shows an S/N ratio in case of spread demodulation using the M-sequence or skipped M-sequences.

Accordingly, the characteristics of the S/N ratio respectively calculated for the M-sequence $e_M$ and skipped M-sequences $e_{SM0}$, $E_{SM1}$ can be expressed as shown in FIG. 16. From the same drawing, it can be understood that even in the case of realistic models, the S/N ratio of this inventive system is markedly higher than that of the conventional system in a relatively large range of p. For example, difference $\Delta S/N$ between the S/N ratios obtained by using the conventional $e_M$ and skipped M-sequence $e_{SM0}$ for the noise model (NM1) of FIGS. 15(*a*), 15(*c*) can be expressed as shown in FIG. 16, thereby obtaining highly improved characteristics.

Figure 17:
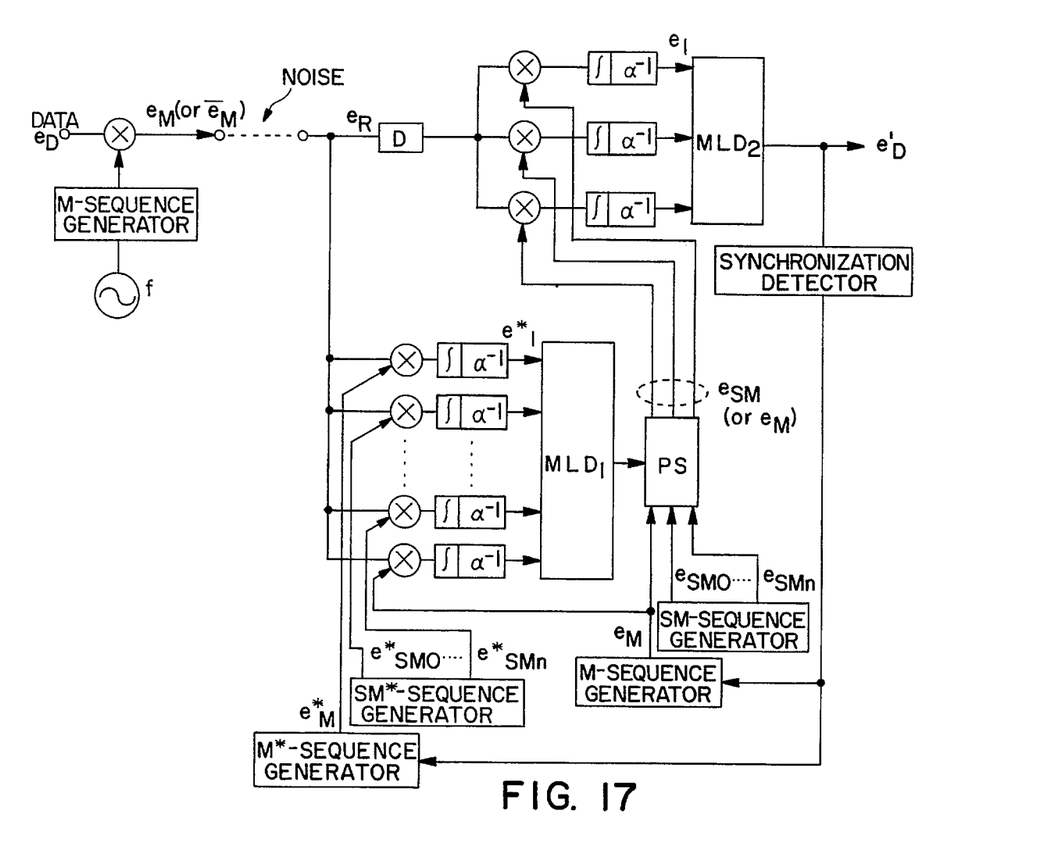
FIG. 17 is a block diagram showing construction of a spread spectrum system using a skipped M-sequence demodulation receiving apparatus.

FIG. 17 is a block diagram of an example of the spread spectrum system using a skipped M-sequence demodulation receiving apparatus according to the aforementioned principle.

The most important problem in realizing this system is to fix means effective for detecting the noise component contained in the received signal. For example, the method using so-called DFT conversion is generally known. However, this method requires complicated construction and much processing time. In addition, though the noise power is usually larger than the signal power at the signal receiving point in normal spread spectrum communication, there is sometimes the case to the contrary in which the noise detection becomes difficult if it is carried out only by the simple comparison as mentioned above. Thus, we proposed a system which utilizes correlated demodulation outputs due to another kind of M-sequence $e^*_M$ and another kind of skipped M-sequence $e^*_{SM}$ to realize simpler construction.

Namely, the term of another kind of M-sequence $e^*_M$ means a sequence which has the same sequence length as the M-sequence $e_M$ and a different code or has a different chip position in the same kind of M-sequence. Further, the term of another kind of skipped M-sequence $e^*_{SM}$ means a skipped M-sequence derived from another kind of M-sequence $e^*_M$. Now we assume that $e^*_{SMi}$ and $e_{SMi}$ have substantially the same demodulation characteristics to each other.

Thus, the correlated demodulation to the received modulated wave is carried out using $e_M$, $e^*_{SM}$ and $e^*_{SMi}$ to obtain $e_{IM}$, $e^*_{IM}$ and $e^*_{ISM}$, respectively. In this case, however, $e^*_{ISMi}$ is multiplied by $\alpha^{-1}$ to conform its power level to the other outputs.

Then, the obtained values are compared to one another and ranked in order to magnitude by comparison circuit $MLD_1$. For example, when the maximum output is obtained as follows, the corresponding judgement result will be fixed as designated on its right side.

| Maximum output | = | $e^*_{ISM0}$ | : | $0 \leq B_H \leq 2.5 f_D$ |
|---|---|---|---|---|
| | | $e^*_{ISM1}$ | : | $2 f_D \leq B_H \leq 4.5 f_D$ |
| | | $e^*_{IM}$ | : | flat noise (Not necessary to use the skipped *M*-sequence) |
| | | $e_{IM}$ | : | $(S/N)_M \gg 1$ (Not necessary to use the skipped *M*-sequence) |

Thereafter, the sequences to be used for the correlated demodulation are determined based on the result of ranking, the desired and generally a plurality of desired sequences are selected by selection circuit PS. In this case, when bands in which the output of $e^*_{ISMK}$ is particularly large and noise occurs frequently are judged, for example, as in bands $H_1$ and $H_2$ such as in FIG. 15(*b*) wherein large noise occurs between 0 and 1 and 1 to 2, the determination of sequences corresponds to selecting skipped M-sequences $e_{ISMK}$ whose output characteristics $e_i(f)$ to the signal in these bands $H_1$, $H_2$ are near to zero. Accordingly, $e^*_{ISMK}$ and $e_{ISMK}$ have characteristics complementary to each other, but do not always have the same skipped positions. Then, the demodulated outputs obtained by these sequences are finally compared to one another by second comparison circuit $MLD_2$. The particular reason for using $e^*_M$ here is to avoid as much as possible the influence of a relatively large signal component contained in the received signal wave.

Further, in case of the system of FIG. 17, when $e_{ISMi}$ is not large enough as compared to $e^*_{ISMi}$, fading occurs in the frequency band corresponding to the i-th pattern so that it can be estimated that the signal power is reduced as much. Therefore, it is also possible to avoid degradation of the S/N ratio due to that fading with reference to such a phenomenon.

In such a case, it is further possible to obtain the correlated demodulation outputs respectively corresponding to the received input and both $e^*_{SMi}$ and $e_{SMi}$ in FIG. 17 and add them to a functionally extended MLD so as to perform the aforementioned judgement. Namely, the skipped M-sequences are selected to prevent the received input in the fading band from appearing in the demodulation output to perform the final correlated demodulation and judgement due to $MLD_2$.

If a sequence which can realize ideal characteristics as shown in FIG. 13(*b*) is present, the S/N ratio can be kept at a high level with significant immunity to increase of the colored noise level.

As described above, a desired frequency component in the received data can be reduced to eliminate unnecessary components, such as noise, by using such skipped spread sequences.

However, from the result of the aforementioned simulation, it can not be said that the ideal characteristics as shown in FIG. 13(*b*) were obtained. Namely, though it can be estimated that many sequences for presenting more ideal S/N characteristics will be found by increasing the code length M, it is difficult in reality to find an M-sequence which corresponds to various characteristics of colored noise.

Thus, the inventors have studied ways to improve the characteristics of this chip-based selective receiving system for processing a spread spectrum signal using the skipped spread sequences and found a new method.

Hereinafter, an embodiment of this invention for realizing such a new method will be described in detail with reference to the drawings.

FIG. 2(*a*) is a waveform of M-sequence $e_M$ used for spread modulation on the transmission side in which the code length M=15.

FIGS. 2(*b*) to 2(*d*) respectively show waveforms of each example of skipped M-sequence $e_{SM}$, shaping sequence $6\Delta$ and shaped M-sequence $e_{SS}$ relating to the present invention respectively obtained from $e_M$. In this case, the shaped M-sequence $e_{SS}$ is obtained from a summing synthesis using the skipped M-sequence $e_{SM}$ and shaping sequence $e\Delta$.

Figure 3A:
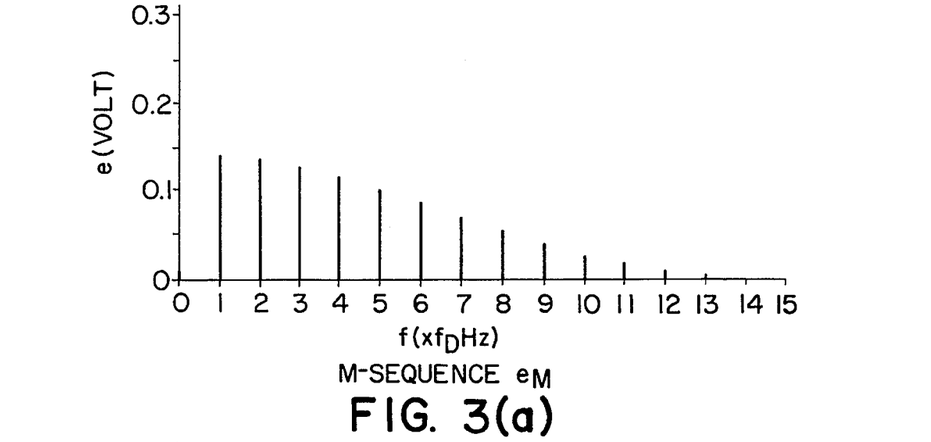
FIGS. 3(a) to 3(c) are spectrum diagrams of M-sequence, skipped M-sequence and attenuation M-sequence, respectively.
Figure 3B:
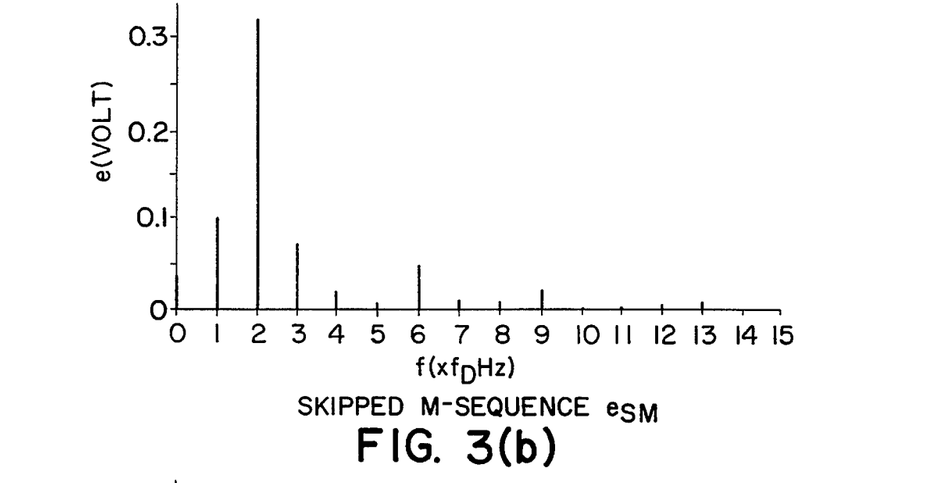
Figure 3C:
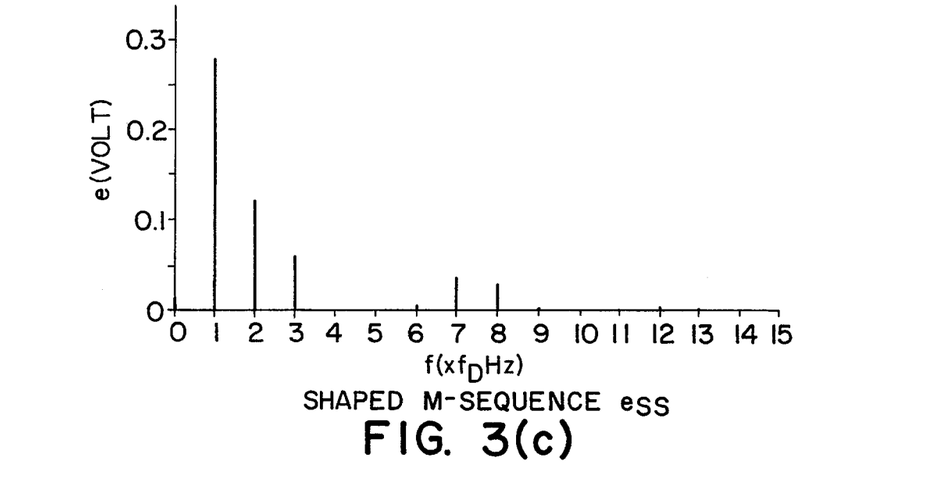

FIGS. 3 respectively show frequency spectra of these sequences based on the DFT analysis. From these drawings, it is understood that the components corresponding to $4f_D$ and $5f_D$ of the skipped M-sequence $e_{SM}$ of FIG. 3(*b*) are reduced as compared with the case of M-sequence $e_M$ of FIG. 3(*a*). On the other hand, in case of the spectrum of shaped M-sequence $e_{SS}$ relating to this invention shown in FIG. 3(*c*), the components corresponding to $4f_D$ and $5f_D$ are almost zero.

Namely, while a slight remainder appears of the spectral components required to be eliminated in the case of the aforementioned skipped M-sequence $e_{SM}$, these remaining components can be cancelled by adding an appropriate shaping sequence eΔ.

Figure 1A:
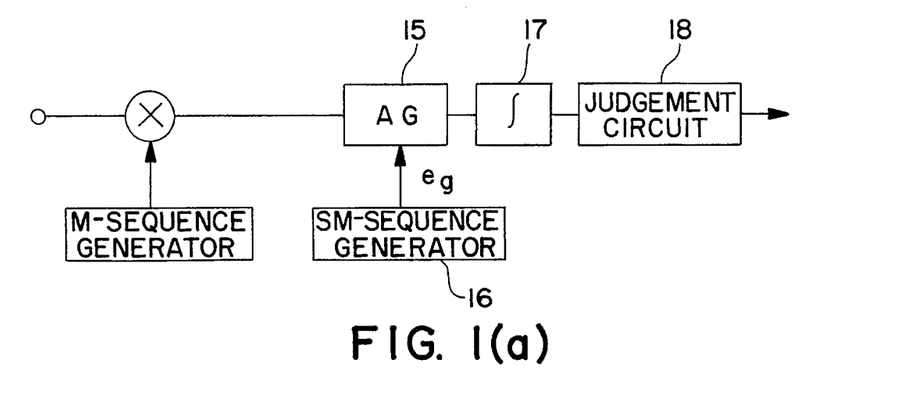
FIGS. 1(a)–1(c) respectively show an embodiment of the spread spectrum system using a shaped M-sequence according to the present invention.
Figure 1B:
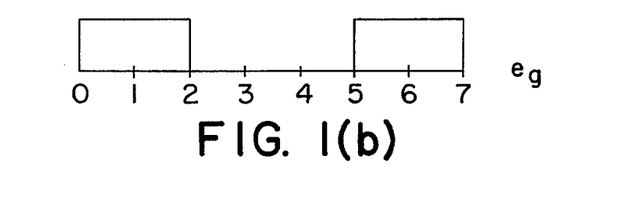

Actually, the construction as shown in FIG. 1(a) can be considered. In the same drawing, reference numeral 15 denotes an FET transistor as an analog gate (AG) which can be realized with ease. Namely, in such construction, the received signal (output of the LPF in FIG. 6) is multiplied by an M-sequence used in the modulation, and the output is introduced into the input terminal (source) of AG 15. Thus, by adding an appropriate skipped pattern binary output $e_g$ (value corresponding to $e_{SM0}$) as shown in FIG. 9–12, as an example, as shown in FIG. 1(b) from SM-sequence generator 16 to the gate terminal of AG 15, the outputs corresponding to the third, fourth and fifth chips are respectively intercepted so as not to appear on the output side.

Figure 1C:
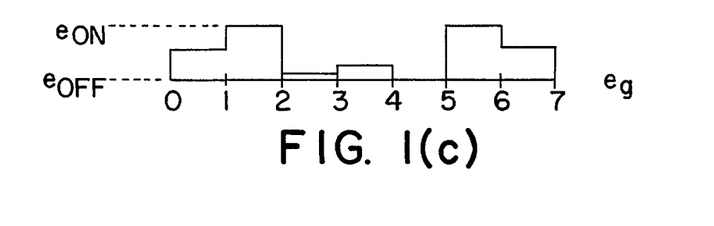

Accordingly, the demodulation using a shaped M-sequence can be realized by applying, for example, a multivalued or analog pattern like $e_g$ as shown in FIG. 1(c) to the gate terminal of AG 15 in place of the binary ON/OFF skipped pattern. Thus, the final data output can be obtained by supplying the output of AG 15 to integrator 17 and processing the integrated result through comparison judgement circuit 18. In that case, the pattern $e_g$ has an intermediate level as well as its ON level $e_{ON}$ and OFF level $e_{OFF}$ (though the voltage is kept at the same level in each chip) so that the higher the voltage $e_g$ becomes, the less the attenuation amount is given when the signal passes through AG 15. Therefore, by performing such multivalued (or analog) control, it becomes possible to bring the frequency characteristics of demodulation output $e_f(f)$ in FIGS. 12 close to the ideal characteristics as shown in FIG. 13(b). Therefore, the S/N ratio can be further improved by this method.

As shown in FIGS. 2, the signs of waveforms at chip numbers 3, 6, 8 of the shaped M-sequence $e_{SS}$ and those of waveforms at the same chip number 3, 6, 8 of the original M-sequence $e_M$ are different from each other, respectively. These chip number chips are the skipping points of the $e_{SM}$, and this phenomenon can occur due to introduction of the modifying sequence eΔ. Therefore, the signal input corresponding to $e_{SS}$ at each of the aforementioned chips does not reach the input terminal of the analog gate AG 15 of FIG. 1(a). Thus, a circuit for accurately obtaining the corresponding output of $e_{SS}$ must be required.

Figure 2A:
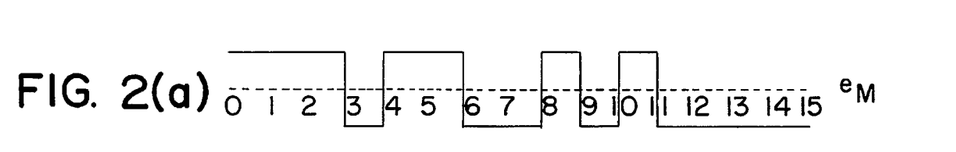
FIGS. 2(a)–2(d) are diagrams respectively showing the principle of shaped M-sequences according to the present invention.
Figure 2B:
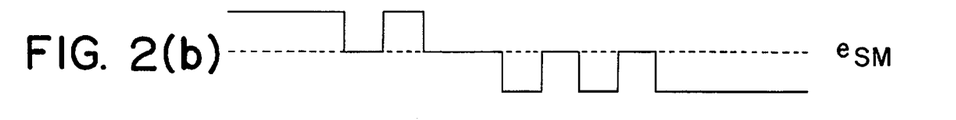
Figure 2C:
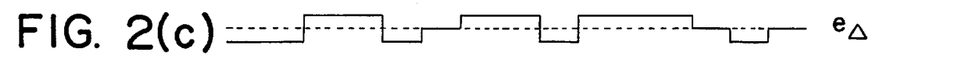
Figure 2D:
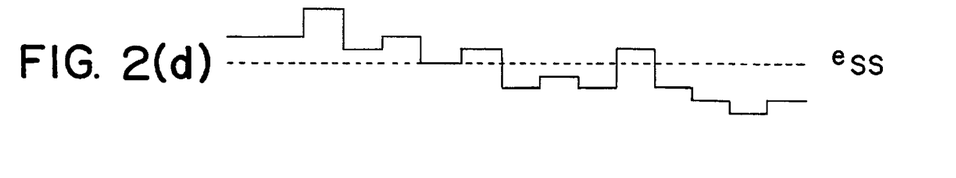
Figure 4A:
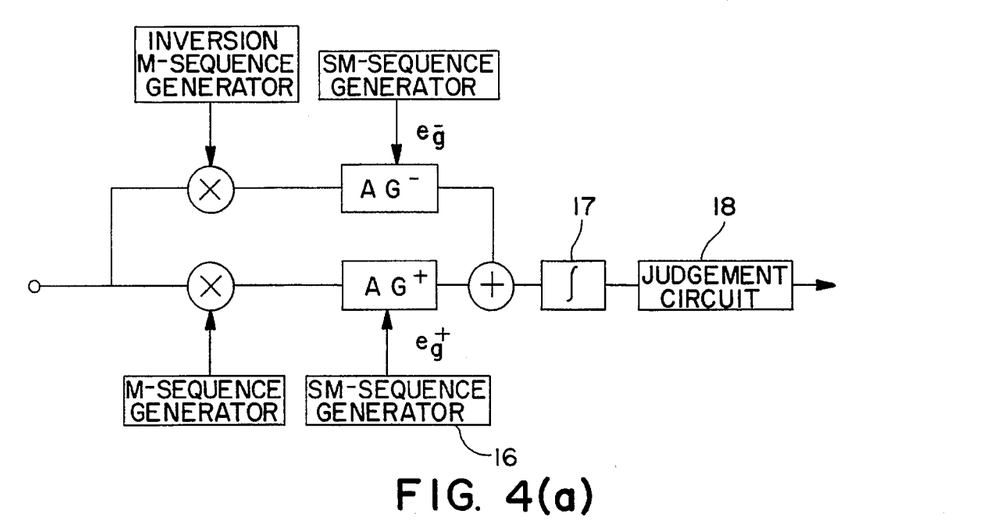
FIGS. 4(a) to 4(d) are diagrams respectively showing another embodiment of the spread spectrum system using a shaped M-sequence according to the present invention.
Figure 4B:
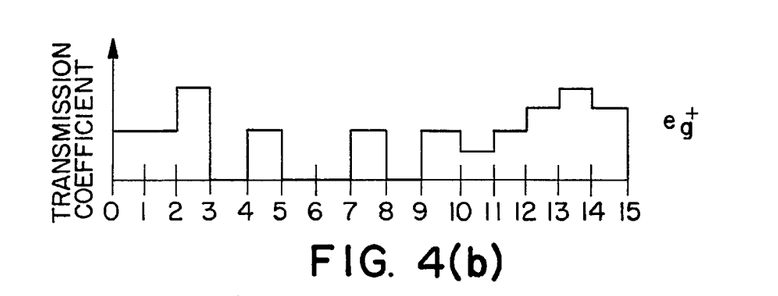
Figure 4C:
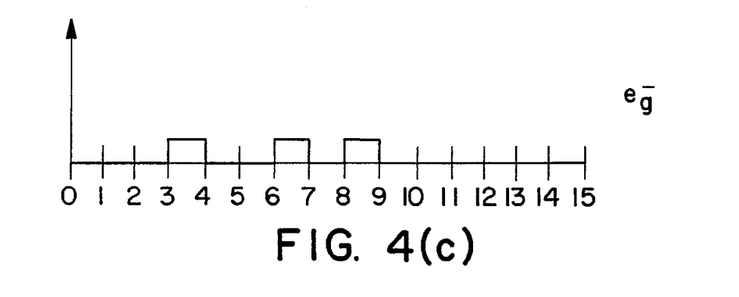

FIG. 4(a) is a block diagram showing an embodiment of the system capable of precise shaping correction. Namely, the system of FIG. 4(a) comprises an additional circuit portion to that of the system of FIG. 1(a). In such a structure, outputs to be obtained by multiplying the received baseband input signal by an M-sequence and an inverted M-sequence are prepared and then applied to AG⁺ and AG⁻, respectively. Thereafter, gate control inputs $e_g^+$ and $e_g^-$ are added to AG⁺ and AG⁻ to control the transmission amount using multivalued patterns as shown in FIGS. 4(b) and 4(c), respectively. As a result, the transmission amount of $e_{SS}$ as shown in FIG. 2(d) can be realized precisely. In this case, $e_g^+$ is dominant to $e_g^-$. The control of transmission amount due to $e_g^-$ has an effect of reducing the integrated output corresponding to the input signal. Thus, $e_g^-$ is used exceptionally for shaping the frequency spectra $4f_D$ and $5f_D$ of FIG. 3(b) to be as small as possible. If such spectra as required to be processed are small or reduced enough in advance, the amount of transmission control due to $e_g^-$ will be unnecessary, and the desired function can be fully achieved only by the circuit of FIG. 1.

Figure 4D:
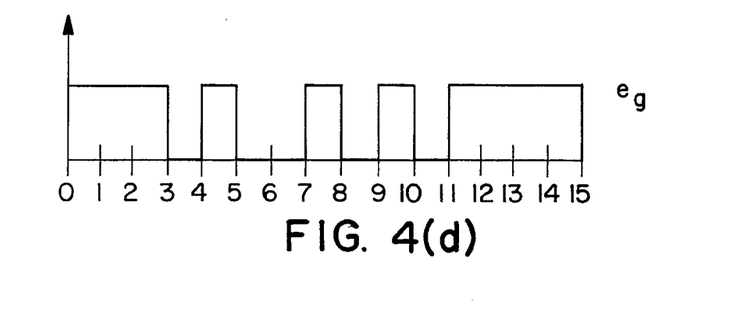

FIG. 4(d) shows gate control input $e_g$ corresponding to the skipped M-sequence which is substantially the same as in FIG. 1(b).

Figure 5:
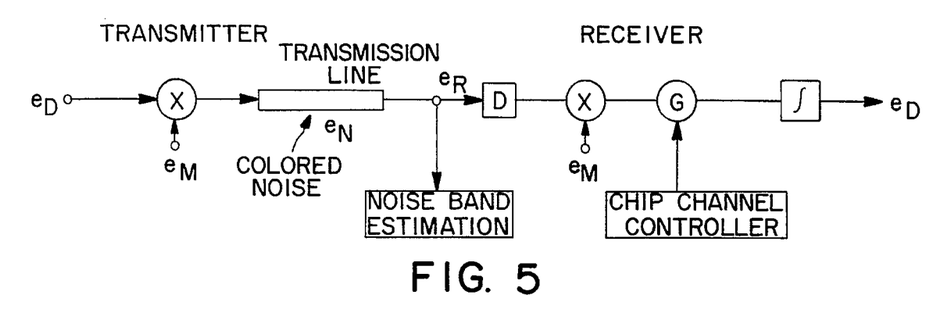
FIG. 5 is a diagram showing still another embodiment of the spread spectrum system using a shaped M-sequence according to the present invention.

FIG. 5 shows another embodiment of this invention, in which the received signal is analyzed by noise band estimation (NBE) for each frame to detect the frequency range containing influential colored noise. A necessary attenuation M-sequence for realizing a spectrum suitable for eliminating the colored noise is selected by a control portion (not shown) based on the result of analysis from NBE. Further, based on the obtained information, a chip channel controller (CCC) performs demodulation using a skipped M-sequence to provide a function equivalent to the shaped M-sequence and controls resistance of an analog gate using a shaping sequence. Therefore, an optimum signal receiving state can be kept automatically.

As stated above, the present invention has been described regarding the embodiments in which the received signal is first processed by spread modulation using an M-sequence and then demodulated by a shaped M-sequence. However, this invention is not limited only to such a system, but can be also applied in general to other code sequences, such as GOLD code sequences.

Further, though only wireless transmission was mentioned in the aforementioned embodiments, wired transmission can be also used. For example, in case of using distribution wires as transmission route, colored noise is likely to occur at a frequency of 50 Hz (or 60 Hz) and its harmonic frequency. Therefore, it is necessary to select the shaped M-sequence in advance so that it can perform demodulation eliminating such frequency components.

Figure 18A:
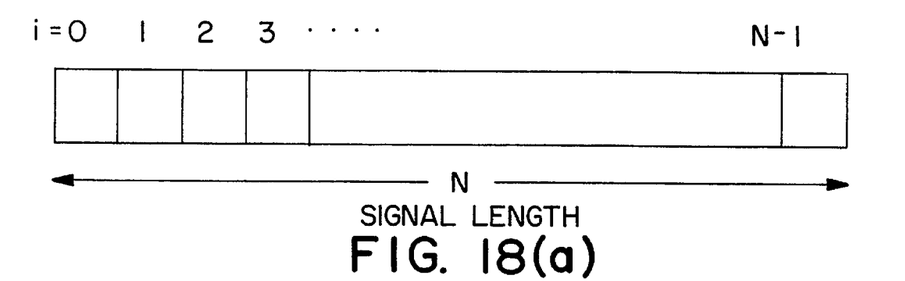
FIG. 18(a) shows a signal length, and 18(b) shows a signal instantaneous frequency.

Next, the case using a discrete chirp signal as the transmission signal will be described. When the length of transmission signal is denoted by N as shown in FI. 18(a), signal Si [=S(i)] to be multiplied to the transmission signal can be expressed as follows if N is an odd or even number.

When N is an odd number, $S(i)=\exp\{[(2\pi(-1))/N]i^2\}$ $0<i<N-1$

When N is an even number, $S(i)=\exp\{[(2\pi(-1))/2N]i^2\}$ $0<i<N-1$

Figure 18B:
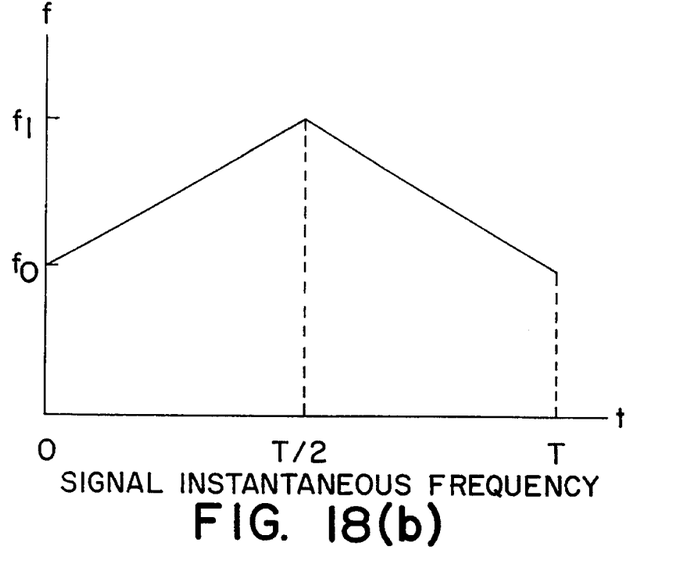

Further, the instantaneous frequency (obtained by differentiating the phase with time) of this signal is designated as in FIG. 18(b).

Accordingly, assuming that the transmitter and receiver are synchronized enough, the signal frequency depends on each corresponding time.

Figure 19:
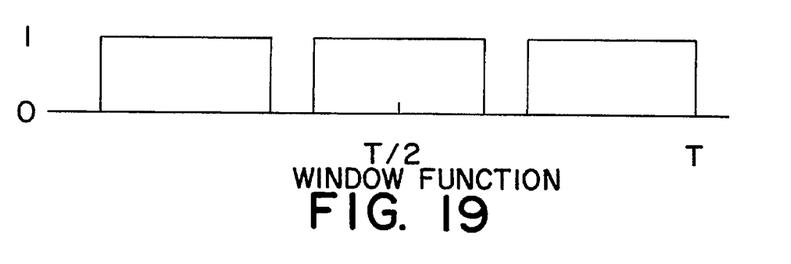
FIG. 19 conceptionally shows a window function.

Let $W_i$ be a window function, as shown in FIG. 19. The window function $W_i$ lacks some time area, which corresponds to some frequency band. Let $S_0$ be the transmitted signal, and $S_i$ be a windowed signal which is obtained from $S_0$ by multiplying by $W_i$. Then, the matched filter for $S_i$ has small correlation to the eliminated frequency band in FIG. 19. We can also define window functions $W_i, W_2, \ldots, W_M$ similarly, so that each window lacks the same width and different location of time area. We can also define windowed signals $S_1, S_2, \ldots, S_M$ which are obtained from $S_0$ by multiplying $W_i, W_2, \ldots,$ or $W_M$. Let $N_c$ be the colored noise in the channel, and assume that the energy of $N_c$ belongs mainly the frequency band, which is eliminated in $S_i$. Then, when the received signal $(S_0+N_c)$ is input into filters, each of which is matched to $S_1, S_2, \ldots,$ or $S_M$, the output of the filter matched to $S_i$ becomes smallest.

In such a manner, it becomes possible to improve the transmission characteristics in case of a transmission route to which colored noise is added.

Accordingly, the present invention markedly effective in performing the spread demodulation which is capable of suppressing the influence of colored noise incoming only on the signal receiving side without requiring any additional provision on the transmission side.

We claim:

1. A chip-based selective receiving system for a spread spectrum signal comprising: a means for receiving a signal processed by spread spectrum modulation through modulation of data to be transmitted by a predetermined spread code sequence, a means for multiplying the received signal by the spread code sequence used in the modulation, means for performing spread spectrum demodulation using another spread code sequence having the same sequence length as said spread code sequence and a relatively small cross-correlation coefficient with said spread code sequence and other plural attenuation spread code sequences based on said another spread code sequence, a means for comparing the outputs obtained by the spread spectrum demodulation and a means for obtaining demodulation data through spread spectrum demodulation by said attenuation spread code sequence corresponding to the frequency characteristics of a one of said plural attenuation spread code sequences providing a maximum magnitude as determined by said means for comparing.

2. A chip-based selective receiving system for a spread spectrum signal comprising: means for receiving a signal processed by spread spectrum modulation through multiplication of a data to be transmitted by a predetermined spread code sequence, means for applying proper attenuation or amplification to non-inverted and inverted outputs resulting from each chip of the spread code sequence, a means for multiplying the received signal by the inverted and non-inverted versions of the spread code sequence used on the modulation, and means for adding the obtained outputs and for applying the sum to a judgment circuit for integrating it over one frame cycle.

3. A chip-based selective receiving system for a spread spectrum signal according to claim 2 or 5, wherein the spread code sequence is an M-sequence code.

4. A chip-based selective receiving system for a spread spectrum signal according to claim 2 or 5, wherein the attenuation spread code sequence is selected to change the level of each predetermined chip so as not to output colored noise components mixed in the received signal after the demodulation.

5. A chip-based selective receiving system for a spread spectrum signal according to claim 3, wherein the spread code sequence is selected to change the level of each predetermined chip so as not to output colored noise components mixed in the received signal after the demodulation.

6. A chip-based selective receiving system for a spread spectrum signal comprising: a means for receiving a signal processed by spread spectrum modulation through multiplication of a data to be transmitted by a chirp signal whose frequency varies with each chip constituting a frame and a means for performing spread spectrum demodulation comprising a means for multiplying the received signal by a window function to produce a windowed signal, and a filter means matched to said windowed signal and through which said windowed signal is passed.

7. A chip-based selective receiving system for a spread spectrum signal comprising: a means for receiving a signal processed by spread spectrum modulation through multiplication of a data to be transmitted by a chirp signal whose frequency varies with each chip constituting a frame, and a means for performing spread spectrum demodulation comprising a means for multiplying an attenuation spread chirp signal by a window function to produce a windowed signal and a filter means matched to said windowed signal and through which said windowed signal is passed.

* * * * *